United States Patent
Ehnebuske et al.

(12) 
(10) Patent No.: US 6,745,381 B1
(45) Date of Patent: *Jun. 1, 2004

(54) METHOD AND APPARATUS FOR ANNOTATING STATIC OBJECT MODELS WITH BUSINESS RULES

(75) Inventors: David Lars Ehnebuske, Georgetown, TX (US); Barbara Jane Alspach McKee, Austin, TX (US)

(73) Assignee: International Business Machines Coroporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 961 days.

(21) Appl. No.: 08/989,674

(22) Filed: Dec. 12, 1997

(51) Int. Cl.[7] ................................................. G06F 9/44
(52) U.S. Cl. ....................................................... 717/100
(58) Field of Search ........................ 706/11, 60; 705/7; 717/2, 100

(56) References Cited

U.S. PATENT DOCUMENTS

| | | | | |
|---|---|---|---|---|
| 4,752,889 A | * | 6/1988 | Rappaport et al. | 364/513 |
| 5,170,464 A | * | 12/1992 | Hayes et al. | 395/76 |
| 5,261,037 A | * | 11/1993 | Tse et al. | 395/76 |
| 5,423,041 A | | 6/1995 | Burket et al. | |
| 5,432,948 A | | 7/1995 | Davis et al. | |
| 5,517,606 A | | 5/1996 | Matheny et al. | |
| 5,627,959 A | * | 5/1997 | Brown et al. | 395/356 |
| 5,644,770 A | | 7/1997 | Burke et al. | |
| 5,802,255 A | * | 9/1998 | Hughes et al. | 395/75 |

OTHER PUBLICATIONS

Principles of Object Oriented Analysis and Design by James Martin (Whole book), 1993.*
Object Oriented Software Engineering A Use Case Driven Approach I. Jacobson et al (125–130,210–257), Jan. 1996.*
Using Rational Rose 4.0 pp. 129–140, Dec. 1996.*
Template SNAP 7.0 pp. 4–16–4–19, Dec. 1995.*
Template SNAP 8.0 pp. 6–9–6–19, Jun. 1997.*
UML, Booch and OMT Quick Reference for Rational Rose 4.0, Nov. 1996.*
Rational Rose/ C + + Round Trip Engineering with Rational Rose, Rational Software Corporation, Nov. 1996.*
Rational Rose Using Rational Rose 4.0 Rational Software Corporation, Nov. 1996.*

* cited by examiner

*Primary Examiner*—T. D. Ingberg
(74) *Attorney, Agent, or Firm*—David A. Mims, Jr.

(57) ABSTRACT

A method and apparatus for providing a methodology and notation which enables an explicit distinction between those features of an object-oriented object model that are intended to be easily changed due to changing business needs, from those features which are fundamental to the object models. The methodology does this during the modeling process by capturing decisions to allow for business-driven variability as explicit diagram annotations called Control Points. The business variable portions of the system of interacting objects are simultaneously captured as objects called Business Rules.

12 Claims, 5 Drawing Sheets

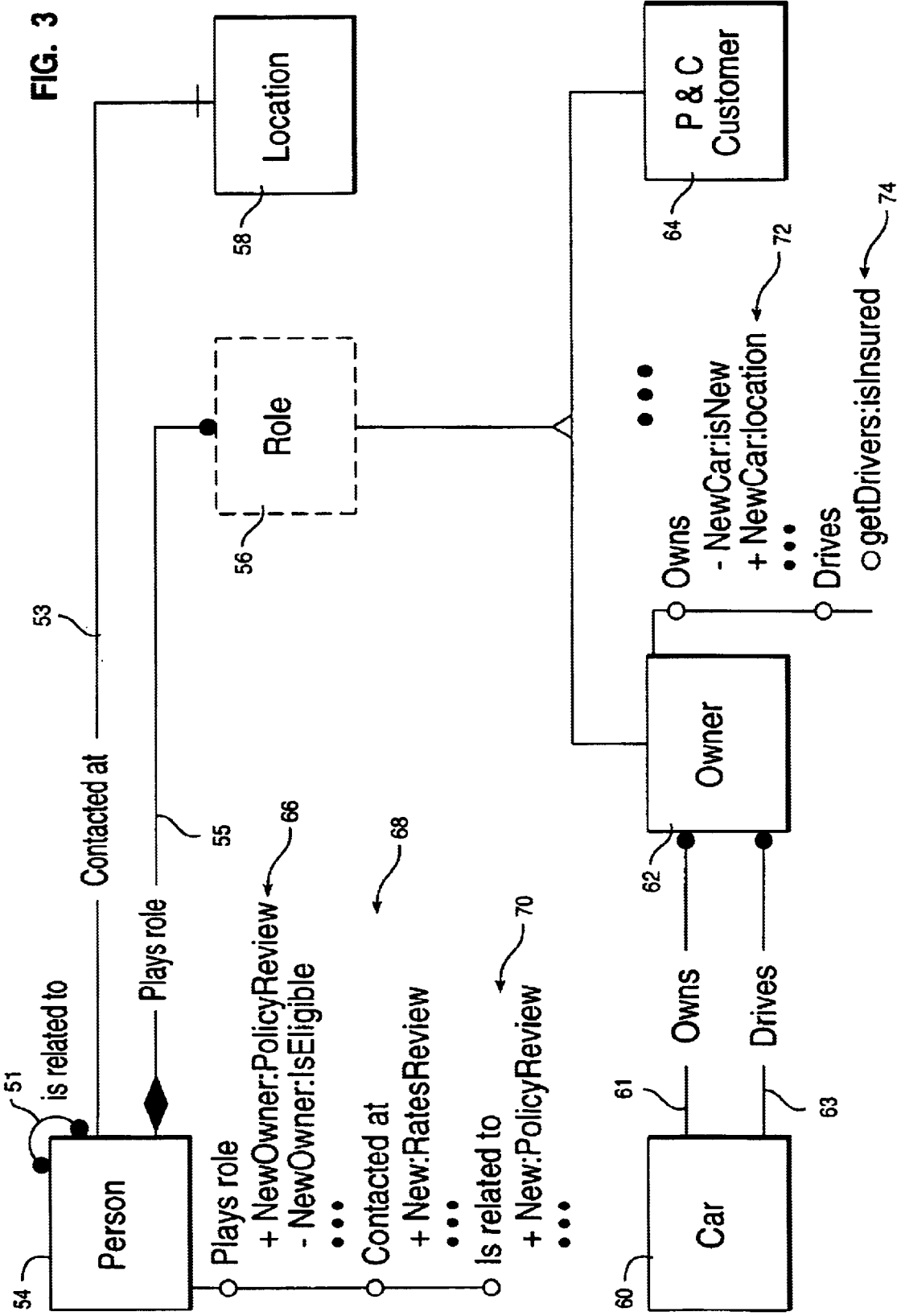

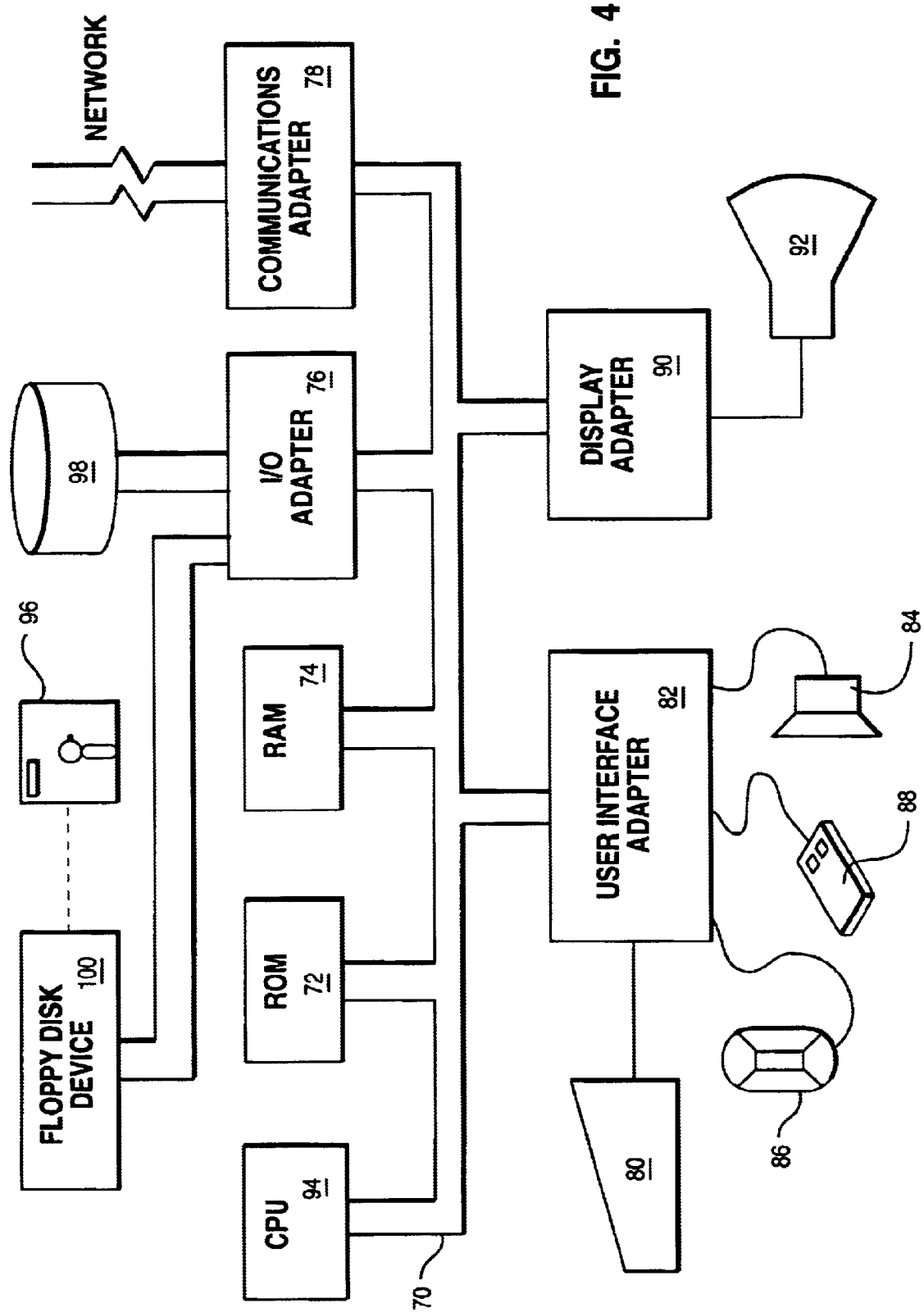

METHOD AND APPARATUS FOR ANNOTATING STATIC OBJECT MODELS WITH BUSINESS RULES

FIELD OF THE INVENTION

The present invention relates to data processing systems, and more particularly, to a methodology and notation for identifying features on object-oriented object models that are fundamental or easily changeable.

CROSS REFERENCE TO RELATED APPLICATIONS

This application is related in subject matter to the following applications filed concurrently herewith and assigned to a common assignee:

Application Ser. No. 08/993,718 filed by David Ehnebuske and Barbara McKee entitled, "Method and Apparatus For Identifying Applicable Business Rules" (IBM Docket AT9-97-503).

The foregoing co-pending applications are incorporated herein by reference.

BACKGROUND OF THE INVENTION

One of the claims for object-oriented programming is that it makes it easier for software to model the real-life business situation. The new vision of computing is of distributed Business Objects existing as independently developed executables or binaries, which can be redeployed as self-contained units anywhere in a network, and on any platform. Powerful and flexible business processes and object modeling tools are evolving that give businesses and information technology (IT) specialists a common environment to define, redefine, model and automate business processes and reusable Business Objects. Businesses are finding, however, that encapsulating business logic into Business Objects provides insufficient flexibility and are moving towards externalizing business decisions into business rules which are described and manipulated by business experts instead of programmers.

Although the term Business Object has been in widespread use, no formal definition existed until the Object Management Group's (OMG) Business Object Management Special Group (BOMSIG) took the task of developing a consensus meaning for the term. Business Objects are representations of the nature and behavior of real world things or concepts in terms that are meaningful to the business. Customers, products, orders, employees, trades, financial instruments, shipping containers and vehicles are all examples of real-world concepts or things that could be represented by Business Objects. Business Objects add value over other representations by providing a way of managing complexity, giving a higher level perspective, and packaging the essential characteristics of business concepts more completely. We can think of Business Objects as actors, role-players, or surrogates for the real world things or concepts that they represent.

Business Objects allow an enterprise to communicate, model, design, implement, distribute, evolve and market the software technology that will enable them to run their business. The characteristics of Business Objects include communication, modeling, design, implementation and distribution. Communication is provided through Business Objects which supply common terms and ideas at a level of detail which can be shared among business and technical people to articulate and understand the business in business terms. Modeling is achieved because Business Objects have certain characteristics and behaviors which enable them to be used naturally in modeling business processes, and the relationships and interactions between business concepts. The design characteristic is possible because Business Objects represent real world-things and concepts which enable the design effort to be concentrated in manageable chunks. Business Objects meet the implementation characteristic because they have late and flexible binding and well defined interfaces so that they can be implemented independently. Finally, distribution is possible because Business Objects are independent so that they can be distributed as self-contained units to platforms with suitable installed infrastructure.

Many business problems are analyzed, designed and documented using an object-oriented modeling notation. The notations in the popular methodologies do a good job of capturing the business operations between Business Objects. Using one of these modeling notation, developers build interface object models, local Business Object models, corporate Business Object models, and storage object models.

An object model is used to describe objects in a system and their relationships. It describes the system, classes, attributes, operations, and relationships in and among the object entities in the system. Each object-oriented entity becomes a class in a class diagram which depicts a graph whose nodes denote object classes and whose arcs denote relationships between classes. In the object model, object identifiers, their attributes, and their methods are described. The object model provides a framework in which the dynamic and the functional models are represented.

Many businesses are finding that they frequently need to quickly change their computing systems as their business needs change. One of the principal goals of doing object-oriented analysis and design for business applications is to structure the Business Object model in such a way as to make this sort of business-driven change quick and easy by business experts instead of programmers. Unfortunately, object models described using popular notations are not explicit about what sorts of changes the object modelers anticipated and what sorts they did not. This creates problems because object modelers are often not clear about which anticipated business changes are accounted for in the model, and it is not clear to those who later must change the model how best to accommodate business-driven changes.

Consequently, it would be desirable to provide a methodology and notation to the object modeling notations to explicitly distinguish those features of the object-oriented object models that are intended to be easily changeable due to changing business needs from those features which are fundamental to the model.

SUMMARY OF THE INVENTION

This invention relates to a method and apparatus for providing a methodology and notation which enables the Object Modeling Technique static object model to explicitly distinguish those features of an object-oriented object model that are intended to be easily changed due to changing business needs, from those features which are fundamental to the object models. The methodology does this during the modeling process by capturing decisions to allow for business-driven variability as explicit diagram annotations called Control Points. The business variable portions of the system of interacting objects are simultaneously captured as objects called Business Rules.

BRIEF DESCRIPTION OF THE DRAWINGS

FIG. 3 is an Object Model using the novel notation of this invention;

FIG. 4 is an illustrative embodiment of a computer system where the present invention may be practiced.

DETAILED DESCRIPTION OF THE EMBODIMENTS

This invention provides methodologies and notations for explicitly distinguishing the variable features of static object models. Features of object models that are intended to be easily changeable due to changing business needs, as well as features which are fundamental to the object model are explicitly distinguished. This invention provides this capability during the modeling process by capturing decisions to allow for business-driven variability as explicit diagram annotations called Control Points. As used in this invention, a Control Point is a pre-configured trigger point in the semantic model of an object-oriented object. The business-variable portions of the system of interacting objects are simultaneously captured as objects called Business Rules.

Figure 1:
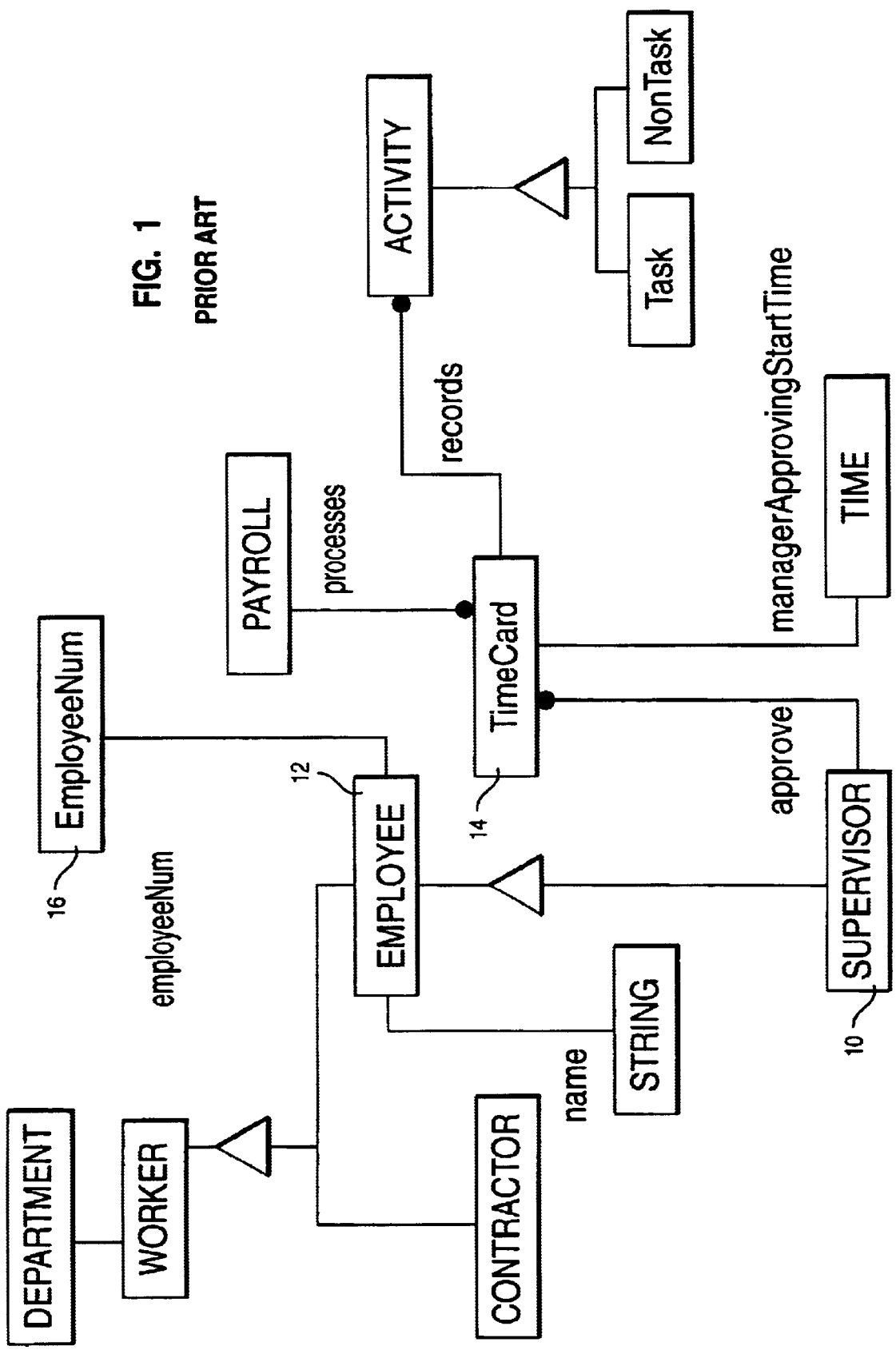
FIG. 1 is a pictorial example of an Object Model using the Object Modeling Technique notation with no variability noted.

Referring now to FIG. 1, there is shown a pictorial representation of an object model using the Object Modeling Technique notation defined by James Rumbaugh, et al. Like all of the popular object modeling methodologies, the OMT notations do a good job of capturing the business operations between Business Objects, thereby easing the job of fully describing and communicating a system of interacting objects. Object modeling notations for static object models typically enclose each class in a box, and indicate an association between two objects by connecting these objects with a line. The association can be "uni-directional" or "bi-directional" and is frequently labeled with a description. The object model of FIG. 1 depicts a domain in which time cards reside and shows some of the characteristics of objects in the domain. For example, a Supervisor 10 is an Employee 12 and approves Time Card 14. A class called Employee-Num (Employee Number) 16 is also created for the case where there are several types of employee numbers used in the application, e.g., employee numbers for direct employees, consultants, temporary employees.

Figure 2A:
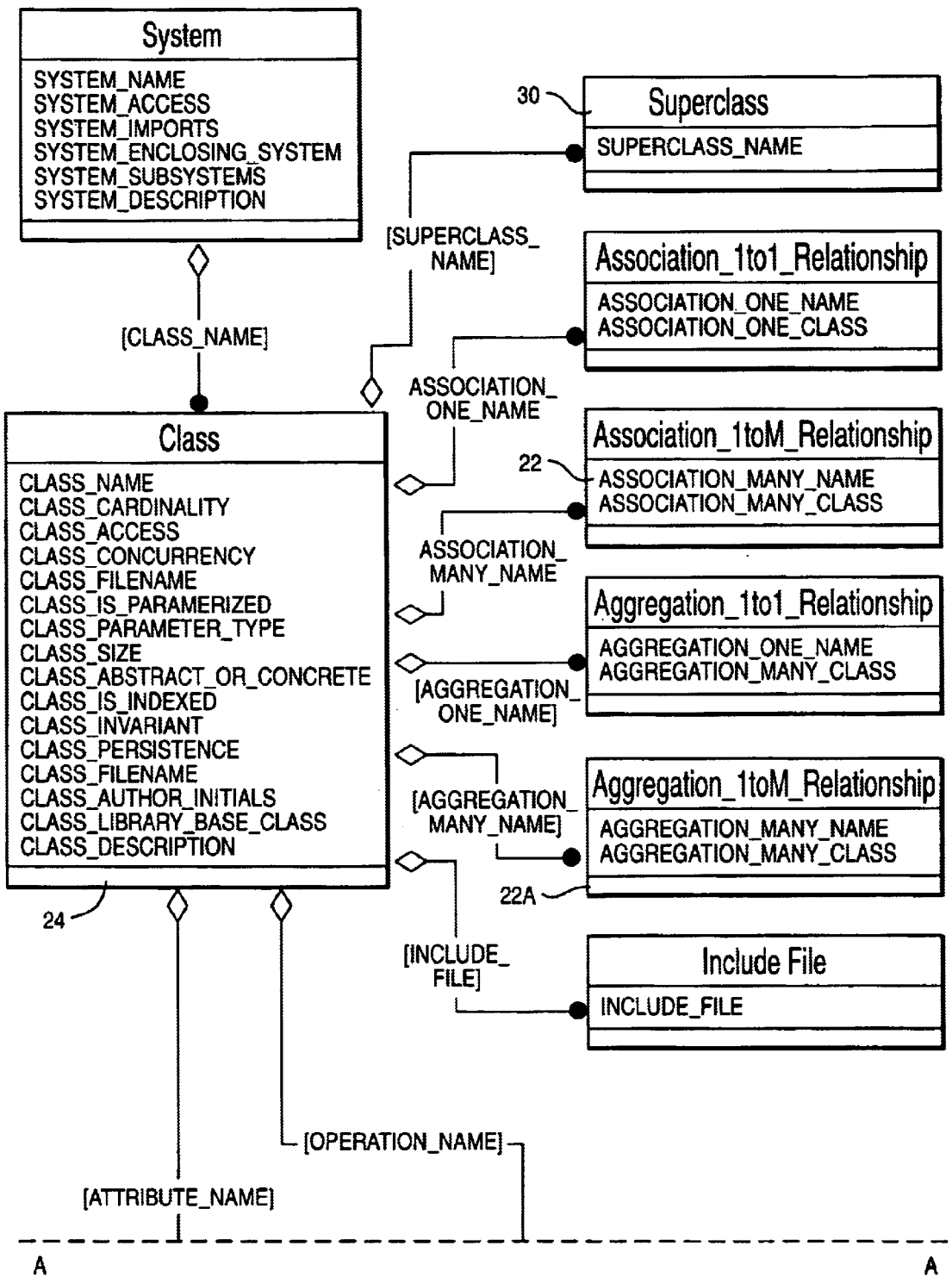
FIG. 2 is an Object Model class diagram showing object-oriented entities and script variables using the Object Modeling Technique notation with no variability noted.
Figure 2B:
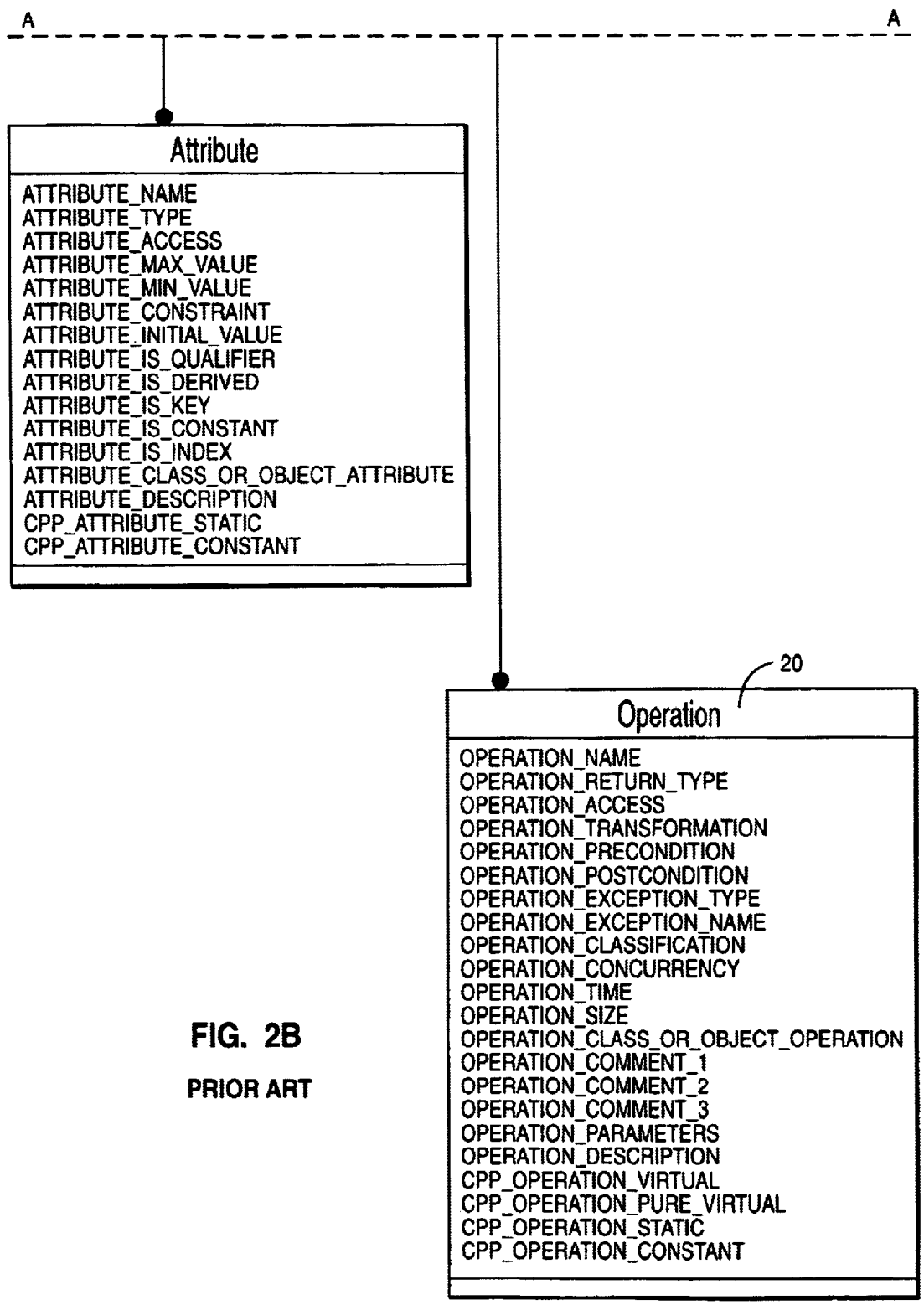

Turning now to FIG. 2, there is shown an example of an Object Model class diagram showing object-oriented entities and script variables. The class diagram is depicted using the Rumbaugh's Object Modeling Technique graphic notation. FIG. 2 shows a class diagram where an Operation Class 20 has a number of attributes. Its attributes are OPERATION_NAME, OPERATION_ACCESS, etc. It is also apparent that a class 24 has several one to many aggregation relationships 22, 22A. For example, a class has one to many aggregation relationships with superclasses 30. If the class 24 is destroyed, then the one to many aggregation relationships with superclasses 30 is also destroyed. As appreciated by those skilled in the art, the class diagram is the core of the object model and is a graph whose nodes denote object classes and whose arcs denote relationships between classes.

Many businesses today are finding that they need to be able to quickly change their computing systems as their business needs change. One of the principal goals of doing object-oriented analysis and design for business applications is to structure the Business Object model in such a way as to make this sort of business-driven change quickly and easily. Unfortunately, object models described using popular notations such as the Object Modeling Technique are not explicit about what sorts of changes the object modelers anticipated and what sorts they did not. This omission causes two problems. First, the object modelers are often not clear about which anticipated business changes are accounted for in the models. Second, it is not clear to those who later must change the model how to best accommodate business-driven changes. This invention introduces a methodology and notation that extends object modeling methodology to explicitly distinguish those features of object models that are intended to be easily changed, due to changing business needs, from those features which are fundamental to the object model. This is achieved during the modeling process by capturing decisions to allow for business-driven variability as explicit diagram annotations called Control Points. The business-variable portions of the system of interacting objects are simultaneously captured as objects called Business Rules.

More concretely, this invention introduces a methodology and notation whereby business operations captured in a static object model are annotated with Control Points to which rules are attached. For example, most modeling methodologies for static object models indicate an association between two objects by connecting these objects with a line. The association can be "uni-directional" or "bi-directional" and is frequently labeled with a description. The object at the originating end of the association is annotated with a tree consisting of the association, the business operations, and the Control Points associated with that association.

Referring now to FIG. 3, there is shown an association between objects which is characterized by a number of business operations which are easily understood by business domain experts. The following objects are shown: Person 54, Role 56, Location 58, Car 60, Owner 62 and P(olicy) & C(ar) Customer 64. A Control Point as used in this invention is an exposed point of variability in business behavior which is encountered during the normal execution of one of these business operations. For example, an association between a Person 54 and a Car 60 might be labeled "owns" 61. The "owns" association may be accomplished using a number of business operations, such as ADD-Car-to-Own, GET-owned-cars, REMOVE-owned-car. Each of these business operations in turn may expose trigger points for variability in business behavior which are encountered during the business operation. Becoming an owner of a new car might trigger a review of the current policy and rates that the new owner currently has in effect. Likewise, for removing a car's ownership association.

Referring again to FIG. 3, there is shown a pictorial of an annotated static object model showing the notations employed to capture the variability in business behavior inherent in object interactions. Extending down from the Person Object is a tree consisting of the name of an object association (e.g., name of the relationship between two objects shown in drawing as temporality Business Operation:Control Point name); the business operations that accomplish the object association; the temporality (e.g., described with a "+", "−" or "o") of the trigger point, and the name of the business behavior variation. Together, the association name, temporality (e.g., before, during, after the performance of a business operation), and business operation define the trigger point. A colon follows each trigger point. To the right of the colon is the name which identifies and describes the variant business behavior.

The notations show Control Points and the business operations which trigger them for selected object associations in the static object model. Business operations for which Control Points are triggered before any of the designed operation takes place are marked with a minus "−". The Control Points which are triggered following the business operation are marked with a plus "+" while those that occur during the operation are marked with circle "o".

One special operation worth noting is that of object instantiation. It is often the case that the type of object on the other end of the association is not fixed.

Often, the choice of type depends on Business Rules. Business Rules may switch in or switch out whole suites of behavior by limiting or suggesting the type of objects that should be instantiated on the other end of a relationship. Implementing a Before-interaction Control Point for the "new" operation is the conventional way of depicting this. Rules can be attached to the "Policy-Review" and "IsEligible" 66 Control Points for the "new" operation between Person and Owner of a Car.

Referring again to FIG. 3, labeled associations include "Plays Role" 55,. "Owns" 61, "Drives" 63, "Contacted At" 53, "Is Related To" 51. Each of these associations is accomplished using one or more business operations, or methods. These include "NewOwner" 66, "NewCar" 72, and "GetDrivers" 74. Each of these business operations can have Control Points which externalize business behavior. These include "PolicyReview" 66 & 70 "Rates Review" 68, "IsEligible" 66, and "Locations" 72, among others. The illustration shows that the "IsEligible" 66 Control Point is triggered before the "NewOwner" operation occurs, while PolicyReview is triggered after the Owner Role has been established. One skilled in the art will appreciate that any number of Control Points encountered during any one business operation may be indicated by listing these other Control Points for the Before and After trigger for the interaction.

The notations described in this invention allow a business domain expert to designate the business decision points for the understood business interactions. Object developers can easily determine what Control Points must be triggered, and when, while implementing the object's semantic interface. The business experts and object developers have a common vehicle with which the variants of the system can be communicated and understood.

Referring now to FIG. 4, there is shown a pictorial representation of a workstation, having a central processing unit 94, such as a conventional microprocessor, and a number of other units interconnected via a system bus 70. The workstation shown in FIG. 4, includes a Random Access Memory (RAM) 74, Read Only Memory (ROM) 72, an I/O adapter 76 for connecting peripheral devices such as floppy disk unit 100 and hard disk 98 to the bus, a user interface adapter 82 for connecting a keyboard 80, a mouse 88, a speaker 84, a microphone 86, and/or other user interface devices such as a touch screen device (not shown) to the bus, a communication adapter 78, for connecting the workstation to a data processing network and a display adapter 90, for connecting the bus to a display device 92. The workstation, in the preferred embodiment, has resident thereon the computer software making up this invention, which may be loaded from diskette 96.

While the invention has been described with respect to a preferred embodiment thereof, it will be understood by those skilled in the art that various changes in detail may be made therein without departing from the spirit, scope, and teaching of the invention. Accordingly, the herein disclosed invention is to be limited only as specified in the following claims.

What we claim is:

1. A method, implemented in a computer system, for providing user indications for manipulating the operation of an object-oriented object, comprising the steps of:

identifying and describing a plurality of triggers for a plurality of control points for said object-oriented object on a static object model;

attaching a notation to each of said plurality of triggers describing a before, during and after operation related to said plurality of triggers on said static object model;

binding one of said plurality of triggers to one of said plurality of control points for said object-oriented object in said computer system based upon said notation; and displaying results of said identifying step and binding step based upon said notation to a user at said computer system.

2. The method of claim 1 wherein the step of identifying and describing further comprises:

identifying and describing said plurality of triggers by object association, temporality, and business operation of said object-oriented object.

3. The method of claim 1 wherein the step of displaying further comprises:

depicting the results as a tree attached to and descending from the object-oriented object which is a source of business object association.

4. The method of claim 2, wherein the step of identifying and describing further comprises:

describing the temporality of said plurality of triggers with a plus symbol, minus symbol and circle.

5. An apparatus for providing user indications for manipulating the operation of an object-oriented object, comprising:

means for identifying and describing a plurality of triggers for a plurality of control points for said object-oriented object on a static object model;

means for attaching a notation to each of said Plurality of triggers describing a before, during and after operation related to said plurality of triggers on said static object model;

means for binding one of a plurality of triggers to one of said plurality of control points for said object-oriented object in a computer system based upon said notation; and means for displaying results of said identifying step and binding step based upon said notation to a user at said computer system.

6. The apparatus of claim 5 wherein said means for identifying and describing further comprises:

means for identifying and describing said plurality of triggers by object association, temporality, and business operation of said object-oriented object.

7. The apparatus of claim 5 wherein the means for displaying further comprises:

means for depicting the results as a tree attached to and descending from the object-oriented object which is a source of business object association.

8. The apparatus of claim 6 wherein the means for identifying and describing further comprises:

means for describing the temporality of said plurality of triggers with a plus symbol, minus symbol and a circle.

9. A computer program product having a computer readable medium having computer program logic recorded thereon for manipulating the operation of an object-oriented object, comprising:

computer readable means for identifying and describing a plurality of triggers for a plurality of control points for said object-oriented object on a static object model;

computer readable means for attaching a notation to each of said plurality of triggers describing a before, during and after operation related to said plurality of triggers on said static object model;

computer readable means for binding one of said plurality of triggers to one of said plurality of control points for said object-oriented object in a computer system based upon said notation; and computer readable means for displaying results of said identifying step and binding step based upon said notation to a user at said computer system.

10. The computer program product of claim 9 wherein said computer readable means for identifying and describing further comprises:

computer readable means for identifying and describing said plurality of triggers by object association, temporality, and business operation of said object-oriented object.

11. The computer program product of claim 9, wherein said computer readable means for displaying further comprises:

computer readable means for depicting the results as a tree attached to and descending from the object-oriented object which is a source of business object association.

12. The computer program product of claim 10 wherein said computer readable means for identifying and describing further comprises:

computer readable means for describing the temporality of said plurality of triggers with a plus symbol, minus symbol and a circle.

* * * * *